(12) United States Patent
Har et al.

(10) Patent No.: US 9,848,328 B2
(45) Date of Patent: *Dec. 19, 2017

(54) USER AUTHENTICATION IN A MOBILE ENVIRONMENT

(71) Applicant: Microsoft Technology Licensing, LLC, Redmond, WA (US)

(72) Inventors: Omer Har, Nof Harim (IL); Ittai Doron, Tel Aviv (IL); Chen Ari Kirsch, Tel Aviv (IL); Avigad Oron, Tel Aviv (IL); Keren Master, Kfar-Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,797

(22) Filed: Aug. 3, 2016

(65) Prior Publication Data

US 2016/0344723 A1 Nov. 24, 2016

Related U.S. Application Data

(63) Continuation of application No. 12/957,399, filed on Dec. 1, 2010, now Pat. No. 9,544,770.

(51) Int. Cl.
*G06F 21/00* (2013.01)
*H04W 12/06* (2009.01)
(Continued)

(52) U.S. Cl.
CPC ............... *H04W 12/06* (2013.01); *H04L 9/14* (2013.01); *H04L 63/045* (2013.01);
(Continued)

(58) Field of Classification Search
CPC ........ H04W 12/06; H04L 63/083; H04L 9/14; H04L 63/045; H04L 63/061; H04L 63/0869; H04L 63/0884; H04L 63/18
See application file for complete search history.

(56) References Cited

U.S. PATENT DOCUMENTS 6,226,678 B1 5/2001 Mattaway et al.
7,221,738 B2* 5/2007 Brown ................... H04M 1/56
379/142.05

(Continued)

OTHER PUBLICATIONS

"Voice Configuration Guide", Retrieved at: http://www.h3c.com/portal/Technical_Support_Documents/Technical_Documents/Routers/H3C_MSR_50_Series_Routers/Configuration/Operation_Manual/H3C_MSR_CG-Release_2104%28V1.07%29/12/201008/686343_1285_0.htm, Retrieved Date: Sep. 3, 2010, pp. 12.

(Continued)

*Primary Examiner* — Kendall Dolly
(74) *Attorney, Agent, or Firm* — Powell IP Law, PLLC

(57) ABSTRACT

A data channel transmission can be used to authenticate a voice channel transmission. An authentication server can authenticate the identity of one or more parties to a call where at least one of the parties to the call is using a mobile device. A PKI authentication methodology or other symmetric or asymmetric encryption/decryption methodology can be used in a mobile network environment to identify and authenticate a first user to a second user. The authentication request sent to the third party trusted server can be encrypted, signed and transmitted over a data channel (such as an internet connection or SMS or MMS connection), concurrent with the voice channel transmission. In response to validation by the third party trusted server, the third party trusted server can send an authentication indication to the second user's device, which can display identification information and other (optional) data associated with the first user.

15 Claims, 5 Drawing Sheets

(51) Int. Cl.
  *H04L 29/06* (2006.01)
  *H04L 9/14* (2006.01)
(52) U.S. Cl.
  CPC .......... *H04L 63/061* (2013.01); *H04L 63/083* (2013.01); *H04L 63/0869* (2013.01); *H04L 63/0884* (2013.01); *H04L 63/18* (2013.01)

(56) References Cited

U.S. PATENT DOCUMENTS

| | | | |
|---|---|---|---|
| 7,693,269 B2 | 4/2010 | Sung et al. | |
| 2003/0112928 A1* | 6/2003 | Brown | H04M 3/2218 379/67.1 |
| 2003/0112935 A1* | 6/2003 | Brown | C09K 8/68 379/114.21 |
| 2005/0273626 A1 | 12/2005 | Pearson et al. | |
| 2006/0074685 A1 | 4/2006 | Brown et al. | |
| 2007/0118750 A1 | 5/2007 | Owen et al. | |
| 2007/0237319 A1 | 10/2007 | Brown et al. | |
| 2008/0155310 A1* | 6/2008 | Langen | G06F 11/2028 714/6.12 |
| 2008/0172728 A1 | 7/2008 | Choyi et al. | |
| 2008/0301783 A1 | 12/2008 | Abrutyn et al. | |
| 2011/0026699 A1 | 2/2011 | Amir et al. | |
| 2011/0231652 A1 | 9/2011 | Bollay et al. | |

OTHER PUBLICATIONS

"Non-final Office Action issued in U.S Appl. No. 12/957,399", dated Jul. 16, 2012, pp. 14.
"Final Office Action issued in U.S Appl. No. 12/957,399", dated Nov. 21, 2012, pp. 17.
"Non-final Office Action issued in U.S Appl. No. 12/957,399", dated Sep. 18, 2014, pp. 15.
"Final Office Action issued in U.S Appl. No. 12/957,399", dated May 22, 2015, pp. 18.
"Notice of Allowance issued in U.S Appl. No. 12/957,399", dated May 26, 2016, pp. 14.

* cited by examiner

USER AUTHENTICATION IN A MOBILE ENVIRONMENT

CROSS-REFERENCE TO RELATED MATTERS

This application is a continuation of U.S. Pat. No. 9,544,770, entitled "User Authentication in a Mobile Environment," the subject matter of which is incorporated herein by reference.

BACKGROUND

A mobile device is a pocket-sized programmable computing device that is capable of doing a number of functions formerly performed by a plurality of other devices including traditional telephones and/or portable or desktop computers. A mobile device typically has a display screen with touch input and/or a miniature keyboard. A personal digital assistant (PDA) is a type of mobile device in which the input and output are often combined into a touch-screen interface. A smart phone is another type of mobile device that offers more advanced computing ability and connectivity than a contemporary basic feature phone. A feature phone is a mobile device that is distinguished from a PDA and a smart phone by having proprietary operating system (OS) firmware. Third-party software is often only supported in a limited way, although this may be changing as newer versions of feature phone software becomes more powerful.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An authentication server and an authentication methodology can be used in a mobile network environment to authenticate a first user to a second user by authenticating a message sent by the first user to the authentication server. The message can include the identity of the first user and other information. Either the first user or the second user can request authentication of the first user to the second user. An authentication request can be sent to an authentication server. The request can be encrypted and/or signed and sent over a data channel (such as but not limited to an Internet connection or telephony messaging system connection such as but not limited to a short message service (SMS) connection or multimedia messaging service (MMS) connection), concurrent with establishment of a voice channel connection between the first user and the second user. In response to successful validation by the authentication server, the authentication server can send an authentication indication to the device of the user receiving the authentication results. The receiving user's device can display identification information and other (optional) data associated with the first user. A data channel transmission is thus used to authenticate a voice channel transmission. The authentication server can vouch for the identification of the first user, the message integrity and the message privacy.

A confirmation response confirming the identity of the second user to the first user can be sent to the first user. The confirmation response can be sent over a data channel (such as an Internet connection or SMS/MMS connection) in parallel to the voice channel transmission. The authentication server can vouch for the identity of the second user, the message integrity and the message privacy.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Overview

Figure 1:
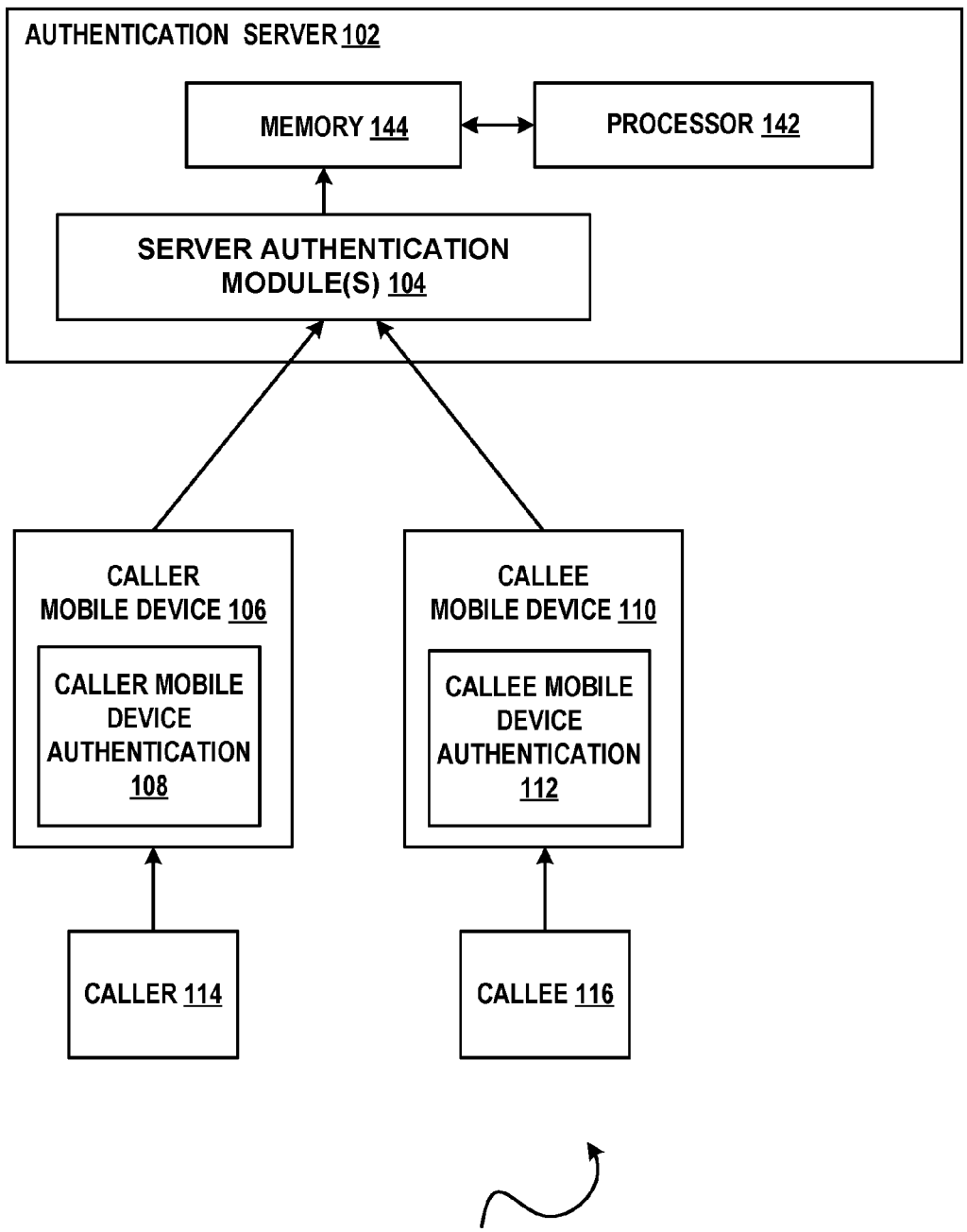
FIG. 1 is illustrates an example of a system 100 for user authentication in a mobile environment in accordance with aspects of the subject matter disclosed herein.

As mobile devices become more widely used, security concerns arise. Currently, when a mobile device user receives a call, there is no guarantee that the caller is who he says he is. For example, a caller may identify himself as a service provider, offering a new service or a current promotion. The caller may request sensitive personal information including account numbers and credit card information. A prudent user may hesitate to provide such information without some degree of assurance that the caller is who he says he is. Similarly, it is difficult for a caller who calls a user to know if the person who answers the call is the person the caller is calling. For example, a service provider may call an account holder's mobile telephone number but without some degree of questioning, does not know if the user who answered the call is the account holder or someone else. Frequently the user is asked a number of questions to establish identity. Answers that match what the service provider has on file for the user are used as an indicator of authenticity. The scenarios presented are by no means the only ones in which security issues arise in connection with the use of mobile devices.

In accordance with aspects of the subject matter disclosed herein, a first user (a first client) or a second user (a second client) can initiate establishment of a connection over a voice channel such as but not limited to a cellular channel. The first user can use a mobile device such as but not limited to a mobile device as described with respect to FIG. 5. The first user can use a computing device such as but not limited to a computer as described with respect to FIG. 3. The first user can be a caller or a callee. The first user can be any user including but not limited to a service provider of telephone services and/or a service provider of data services or a customer or potential customer. The first user can request his identity be sent to the second user and optionally can request a reply from the second user authenticating the second user to the first user.

A second user can use a mobile device such as but not limited to a mobile device as described with respect to FIG.

5. The second user can use a computing device such as but not limited to a computer as described with respect to FIG. 3. The second user can be a caller or a callee. The second user can be any user including but not limited to a service provider of telephone services and/or a service provider of data services or a customer or potential customer. The second user can receive the identity of the first user and can reply with his identity, thereby authenticating the second user to the first user.

A voice channel can be established between the first user and the second user. The connection can be initiated by either the first user or the second user. At least one of the parties to the call uses a mobile device. The other party can use either a mobile device, a landline telephone or a computer. In response to a request for authentication by either party for either party, an authentication process can be initiated as described herein.

In response to one user (i.e., a requesting user) requesting authentication of the identity of the first user, (i.e. the user for whom authentication is requested) the authentication process can be initiated by a user-provided application or by an application provided with the mobile device or computer. The first user can send an authentication request, requesting the server to authenticate the identity of the first user and send the authentication to the second user. The application can make a call to a server application programming interface (API) on an authentication server. Substantially concurrently with transmitting the voice transmission over the voice channel, a signed and/or encrypted authentication request can be transmitted to the authentication server over a data channel, such that the data channel transmission is used to authenticate the voice channel transmission.

The authentication request can be a message encrypted using the server's public key (also called the server's public certificate) and signed using the private key (also called the private certificate) of the first user (the user for whom authentication has been requested), using PKI authentication methodology (asymmetric key encryption/decryption). Alternatively, another type of authentication methodology can be used including but not limited to symmetric key encryption/decryption). The authentication request can include identification information associated with the authentication request sender and/or can include identification information associated with the user whose identity is being authenticated. The authentication request can also include other information volunteered by the authentication request sender. The authentication request can include information desired by the requesting user. The authentication request can include a request for confirmation of the receiving user's identity. The authentication request can be sent over a data channel such as but not limited to an Internet connection or SMS/MMS connection. SMS is a text communication service component of telephone, web or mobile communication systems. SMS uses standardized communications protocols that allow the exchange of short text messages between fixed line or mobile telephone devices. MMS uses standardized communications protocols that allow the exchange of multimedia messages between fixed line or mobile telephone devices.

An authentication server can receive the authentication request. If the authentication request sender requests authentication of himself to the authentication receiver, the authentication server can decrypt the encrypted message and/or can verify that the message is signed by the user that the message indicates is the sender, thereby authenticating the identity of the user whose identity is being authenticated. A message indicating that the user whose identity is being authenticated has been authenticated can be sent to the receiving user (the second user). If however, the authentication server does not successfully decrypt the encrypted message and/or is not able to verify that the message is signed by the user that the message indicates is the sender, authentication fails and a message indicating that the authentication server was unable to authenticate the identity of the user whose identity is being authenticated can be sent to the first user and/or to the second user. The user whose identity is being authenticated can be prompted to enter credentialing information again before the message indicating that the authentication server was unable to authenticate identity is sent.

The authentication server may have a data store of user information that includes the mobile telephone numbers of users, usernames, passwords, PIN codes, the name, address and public keys for users, credentialing information, identification information and so on. The authentication server can look up in its data store, the mobile telephone number of the user to whom the authentication information will be sent (the second user). A message indicating success or failure of authentication can be prepared and sent to the second user, the user receiving the authentication results. If authentication of the user being authenticated was successful, the identity of the user being authenticated, any other information about the user in the authentication server's data store and any information volunteered by the user requesting authentication can be sent to the user receiving the authentication. The message sent from the server to the user receiving the authentication results can include information that indicates that a trusted third party server recognizes the authenticated user and can indicate that the authentication server trusts the authenticated user. The message can be signed by the server using the server's private key and/or encrypted with the receiving user's public key. Alternatively, symmetric key or other encryption/decryption methodologies can be employed by the authentication server in its authentication process.

The user receiving the authentication information from the authentication server (the second user) can have an application on the mobile device or computer that can receive the message, can decrypt the encrypted message and/or can check that the message is actually signed by the server. The identification information provided in the message received from the server can be displayed to the second user via an application such as a pop-up or other application. If authentication of the second user is requested by the first user, the second user can be prompted for credentials including but not limited to a password or personal identification number (PIN) code and/or other information. The second user can enter the information for which he is prompted and can encrypt and/or sign the confirmation message. The encrypted and/or signed message can be sent to the authentication server. The authentication server can decrypt and/or validate the digital signature to authenticate the confirmation message and thus the second user. The credentialing information can be verified against information stored at the authentication server for the user. If decryption and/or validation of the confirmation fail, authentication of the second user fails. The results of the authentication can be sent to the user requesting the confirmation message in an encrypted and/or signed confirmation message sent from the authentication server.

User Authentication in a Mobile Environment

FIG. 1 illustrates an example of a system 100 that authenticates a transmission of a user of a mobile device in accordance with aspects of the subject matter disclosed herein. All or portions of system 100 can reside on one or more computers. A computer is described below with respect to FIG. 3. System 100 or portions thereof may be provided as a stand-alone system or as a plug-in or add-in.

System 100 may include one or more computers or computing devices and/or one or more mobile devices such as caller mobile device 106 and/or callee mobile device 110. A computer of system 100 can be a user computer such as a laptop, desktop or notebook computer capable of making a call to a mobile device such as callee mobile device 110 and/or capable of receiving a call from a mobile device such as caller mobile device 106. A computer or computing device can be a computing device such as authentication server 102. Authentication server 102 can be a trusted third party server used as part of a public key infrastructure (PKI) authentication methodology. Alternatively, authentication server 102 can use symmetric key encryption/decryption methodology or another type of encryption/decryption methodology to authenticate a user. Authentication server 102 can include a processor (such as processor 142) and a memory such as memory 144. Authentication server 102 can include one or more modules comprising one or more authentication modules, represented in FIG. 1 by server authentication module 104. Other components well known in the arts may also be included but are not here shown. It will be appreciated that the above described module or modules can be loaded into memory 144 to cause one or more processors such as processor 142 to perform the actions attributed to the modules. System 100 instead or in addition, may include one or more mobile devices including but not limited to mobile devices such as caller mobile device 106 and/or callee mobile device 110. A mobile device is described below with respect to FIG. 5.

A first user using a mobile device or a computer can authenticate his identity to a second user using a mobile device or a computer. At least one of the two users uses a mobile device. One of the users can use a computer or computing device. For example, referring to FIG. 1, a first user can be a caller such as caller 114 using a caller mobile device 106. Caller 114 can authenticate his identify to a second user, callee 116 using a callee mobile device 110 as described herein. Caller mobile device 106 can include one or more authentication modules including but not limited to caller mobile device authentication module 108. Callee mobile device 110 can include one or more authentication modules including but not limited to callee mobile device authentication module 112. It will be appreciated that caller mobile device 106 can also include one or more authentication modules including but not limited to a callee mobile device authentication module (not shown). Alternatively, caller 114 or callee 116 can use a computer.

Caller 114 (e.g. a service provider) can authenticate his identity to callee 116 (e.g. a customer or potential customer) by sending an authentication request to a third party trusted server (e.g., authentication server 102). The authentication request can include information identifying the caller 114, information identifying the callee 116, any other information that caller 114 would like callee 116 to have and/or any other information that caller 114 specifies. The request can be sent over a data channel such as but not limited to an Internet connection or SMS/MMS connection. The request can be signed using the caller's private key and encrypted using the server's public key or other encryption/decryption methodologies can be used.

Similarly, a first user can be a callee such as callee 116 using a callee mobile device such as callee mobile device 110 and can authenticate his identify to a second user, caller 114 using a caller mobile device 106 as described herein. Callee mobile device 110 can include one or more authentication modules including but not limited to callee mobile device authentication module 112. Caller mobile device 114 can include one or more authentication modules including but not limited to caller mobile device authentication module 108. It will be appreciated that callee mobile device 110 can also include one or more authentication modules including but not limited to a caller mobile device authentication module (not shown).

For example, callee 116 (e.g. a service provider) can authenticate his identity to caller 114 (e.g. a customer or potential customer) by sending an authentication request to a third party trusted server (e.g., authentication server 102). The authentication request can include information identifying the callee 116, information identifying the caller 114, any other information that callee 116 would like caller 114 to have and/or any other information that callee 116 specifies. The request can be sent over a data channel such as but not limited to an Internet connection or SMS/MMS connection. The request can be signed using the callee's private key and encrypted using the server's public key or can use other encryption/decryption methodologies. Alternatively, caller 114 or callee 116 can use a computer.

An authentication server such as authentication server 102 can receive the authentication request, can decrypt the encrypted request using the server's public key and the digital signature can be verified using the public key of the user sending the message. Alternatively, the authentication server can decrypt the encrypted request using symmetric key encryption/decryption methodology or other encryption/decryption methods. If the decryption fails, the authentication of the sender's transmission (and thus authentication of the identity of the sender) fails. If the digital signature cannot be verified, the authentication of the sender's transmission fails. Moreover, authentication server 102 can verify that information included in the transmission sent by the sender agrees with information for the sender stored in a data store associated with the authentication server 102. If decryption is successful and the digital signature of the sender of the message is verified, and the information included in the transmission by the sender agrees with information stored in the data store of the authentication server 102, the transmission (the identity) of the sender is authenticated.

In response to successful authentication of the sender's message, the authentication server 102 can send a message to the second user, the user identified in the authentication request as the receiver of the authentication information. The authentication server 102 can look up the mobile telephone number of the second user in its data store and can send the second user a message. The server message can include an indication from the authentication server 102 indicating that the authentication server 102 recognizes the first user. The server message can also include identification information associated with the sender including name, address, any information volunteered by the sender and so on. The information provided in the server message may represent identification information stored in the authentication server's database. The server message can be encrypted using the second user's public key and signed using the authentication server's private key. Alternatively, symmetric key encryption/decryption or other encryption/decryption methods can be used.

An application on the device of the second user including but not limited to callee mobile device authentication module 112 or caller mobile device authentication module 108 can receive the signed and encrypted server message from the authentication server 102. To authenticate that the message comes from the authentication server 102 (e.g., a trusted third party) the message can be decrypted using the second user's private key and the digital signature can be verified using the authentication server's public key. Alternatively, symmetric key encryption/decryption or other encryption/decryption methods can be used. If the decryption fails, the authentication of the authentication server fails. If the digital signature cannot be verified, the authentication of the authentication server fails. If decryption is successful and the digital signature of the authentication server is verified, the server message is authenticated. Because the authentication server is a trusted third party and the second user can verify that the message received is really from the authentication server, the second user can be assured that the information included in the message concerning the sender's identity can be trusted. In response to successful validation of the authentication of the message, the authentication module of the client application on the second user's mobile device or computer can display the sender's identification information to the second user's mobile device or computer.

Optionally, if the identity of the second user is requested by the first user, the mobile device authentication module of the mobile device of the second user can prompt the second user for his credentials. The credentials of the second user may include but are not limited to password or a personal identification number (PIN) code of the second user. This identification message (a confirmation response) can be encrypted using the authentication server's public key and signed using the private key of the second user. Alternatively, symmetric key encryption/decryption or other a encryption/decryption methods can be used. The encrypted signed confirmation message can be sent to the authentication server 102 over a data channel.

The authentication server 102 can receive the confirmation message from the second user. To authenticate that the message comes from the second user, the message can be decrypted using the authentication server's private key and the digital signature can be verified using the public key of the second user. Alternatively, symmetric key encryption/decryption methodology or other encryption/decryption methodology can be used. If the decryption fails, the authentication of the of the second user fails. If the digital signature cannot be verified, the authentication of the of the second user fails. If decryption is successful and the digital signature of the second user is verified, the confirmation message is authenticated.

In response to successful authentication of the confirmation message, the authentication server 102 can encrypt the confirmation message using the public key of the first user and sign the confirmation message using the server's private key. Alternatively, symmetric key encryption/decryption methodology or other encryption/decryption methodology can be used. The first user can receive the confirmation response over a data channel (such as an internet connection or SMS/MMS connection) on the identity of the second user in parallel to the voice channel.

The first user can receive the encrypted, signed confirmation message from the authentication server 102. An application on the mobile device of the first user can receive the signed and encrypted confirmation message from the authentication server 102. To authenticate that the message comes from the authentication server 102 the message can be decrypted using the private key of the first user and the digital signature can be verified using the authentication server's public key. Alternatively, symmetric key encryption/decryption methodology or other encryption/decryption methodology can be used. If the decryption fails, the authentication of the authentication server confirmation message fails. If the digital signature cannot be verified, the authentication of the authentication server confirmation message fails. If decryption is successful and the digital signature of the authentication server is verified, the authentication server confirmation message is authenticated. Because the authentication server is a trusted third party and the first user can verify that the message received is really from the authentication server, the first user can be assured that the information included in the message concerning the identity of the second user can be trusted. In response to successful validation of the authentication of the confirmation message, the authentication module on the device of the first user can display the authenticated information to the first user.

Figure 2:
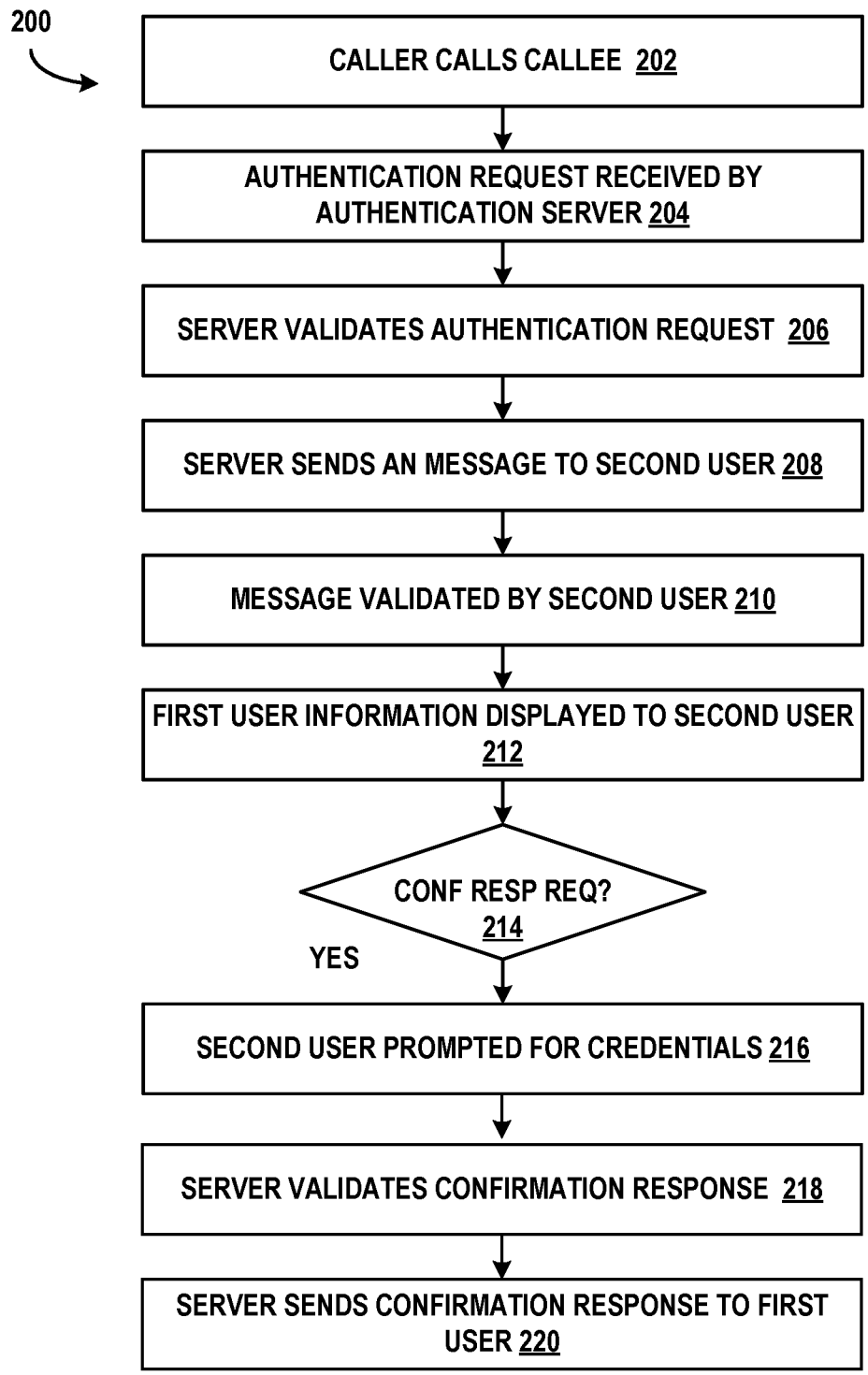
FIG. 2 is a flow diagram of an example of a method 200 for user authentication in a mobile environment in accordance with aspects of the subject matter disclosed herein.

FIG. 2 is an example of a method 200 that authenticates users in a mobile network environment in accordance with aspects of the subject matter disclosed herein. Method 200 can be implemented on a system such as but not limited to the one described with respect to FIG. 1. Some of the actions described below can be optional. Some of the actions described below can be executed in a sequence that differs from that described below.

At 202 a caller can initiate a call to a callee. The caller can initiate the call on a mobile device over a cellular voice channel, from a computer over a data channel or from a landline telephone over a voice channel. The caller can be a first user or a second user. The callee can be a first user or a second user. At least one of the first user or the second user uses a mobile device. At 204 an authentication request can be sent by the first user or the second user over a data channel to a third party trusted authentication server. The authentication request can request the authentication server to authenticate the first user to the second user. The authentication request can include identification information associated with the sender of the authentication request. The authentication request can be sent using a data channel (such as but not limited to an Internet connection, an SMS connection or an MMS connection) which can be concurrent with the active cellular call. At 206 the authentication request can be signed using the sender's private key and encrypted using the server's public key using PKI authentication methodology. Alternatively, symmetric key or other encryption/decryption methodologies can be used. The third party trusted server can check the integrity of the request, and can validate or invalidate the identity of the sender of the authentication request as described above.

At 208 the third party trusted server can send a message to the second user, the user receiving the authentication results. The message can include information associated with the first user, as registered in the server's database, and any other data sent in the authentication request. The message can be encrypted using the second user's public key and signed using the authentication server's private key. At 210 an authentication module on the second user's device can validate the integrity of the message's origin, as described above. At 212 the identification information associated with the first user can be displayed to the second user along with any additional data indicated in the authentication request. At 214, if identification of the second user is requested, at 216 the second user can be prompted for credentials (password, PIN code, etc.), which can be validated by the third party trusted server at 218 before the confirmation message is returned to the first user at 220, preventing unauthorized use of the second user's certificate by a malicious user of the device.

Example of a Suitable Computing Environment

Figure 3:
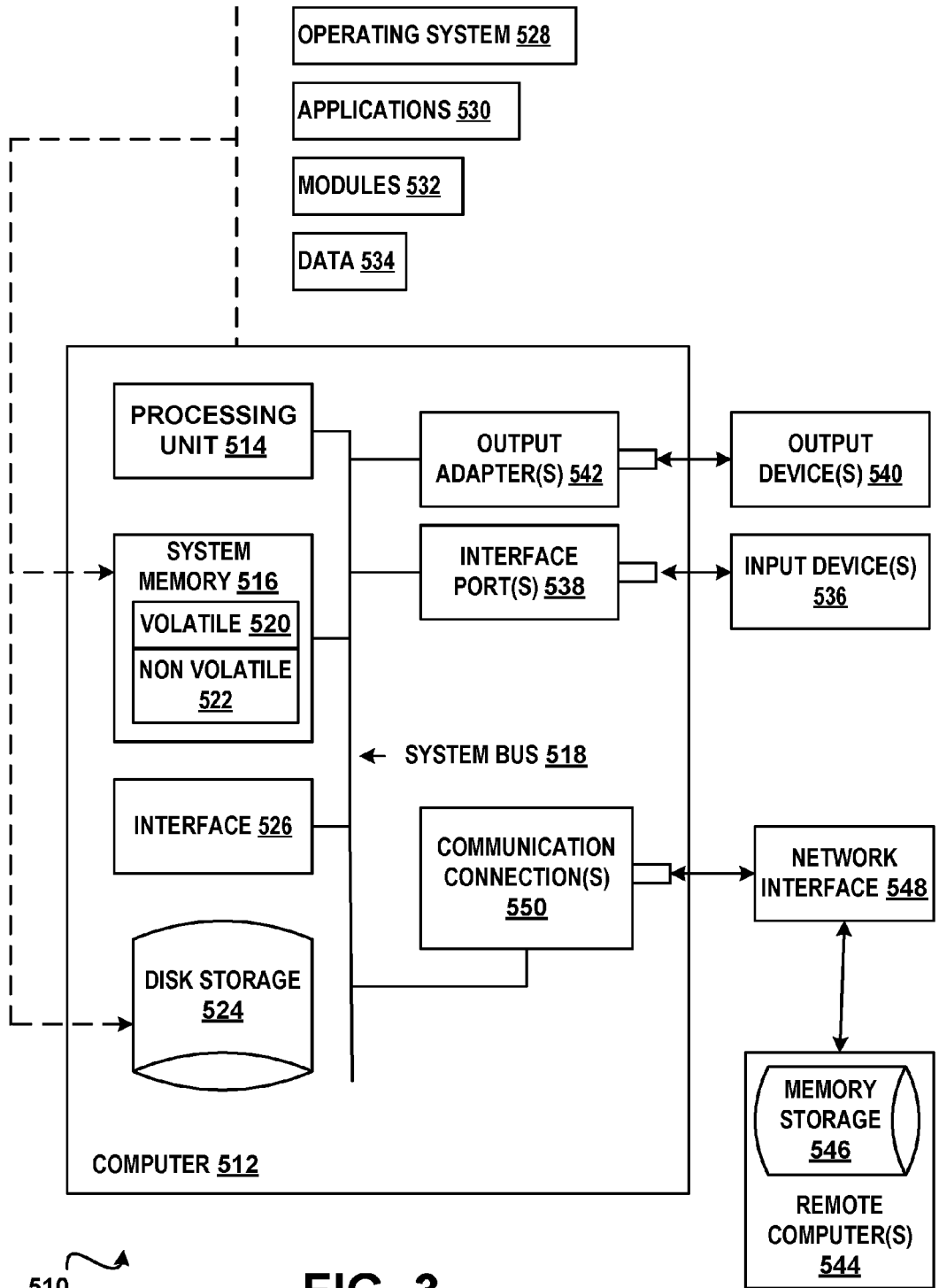
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524.

It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-particular programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
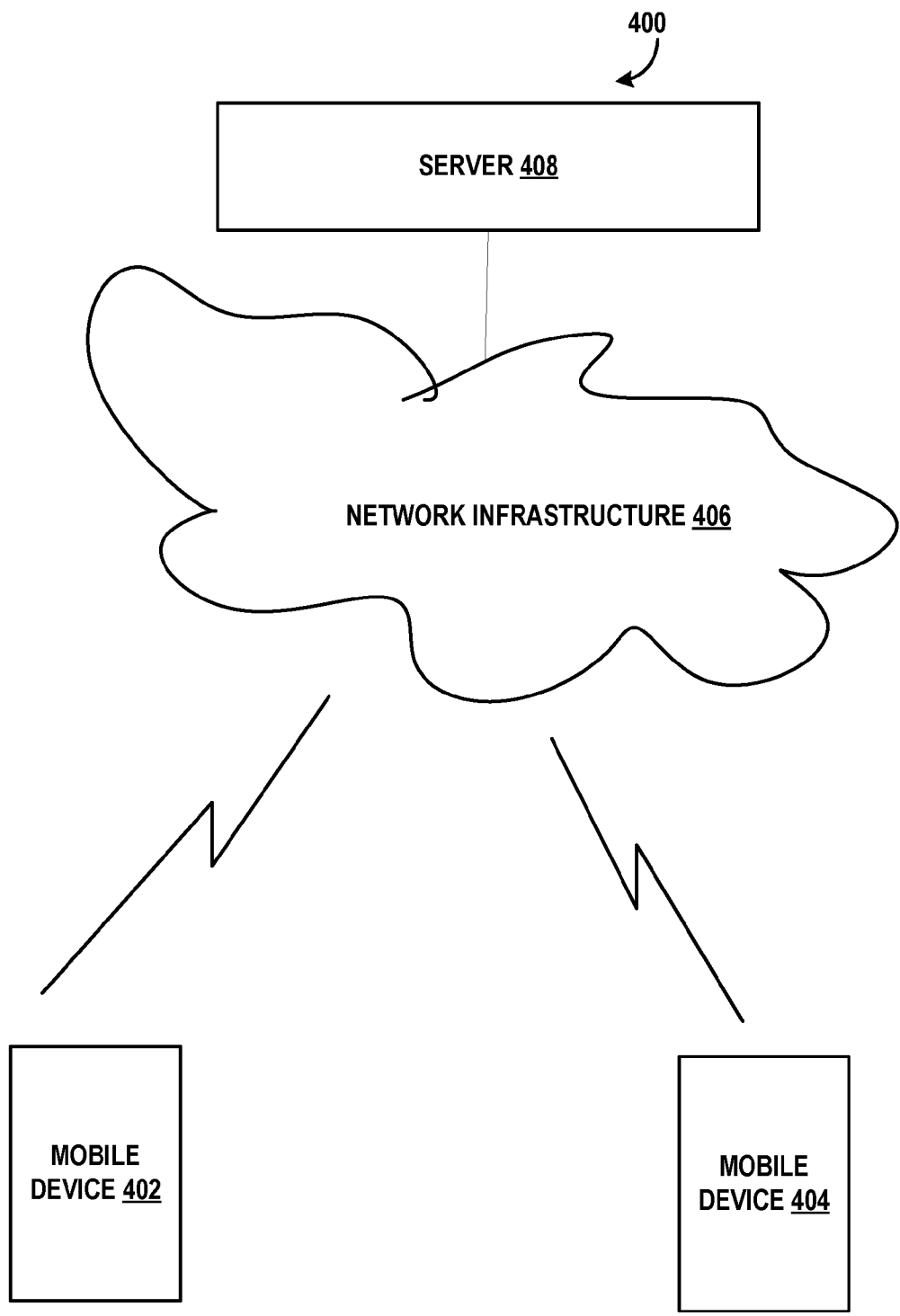
FIG. 4 is a block diagram of a system supporting authentication in a mobile environment in accordance with aspects of the subject matter disclosed herein.

FIG. 4 illustrates an example of a system 400 that supports authentication of mobile devices. System 400 may include one or more devices including but not limited to: a first mobile device such as mobile device 402 and a second mobile device such as mobile device 404. Alternatively, a computer such as the computer described with respect to FIG. 3 can be used as long as one of the devices that is a party to the call is a mobile device. Each of the mobile devices can exhibit some common base configuration items including but not limited to a display (e.g., a color display), a text input capability, non-volatile storage memory, etc. Each device may also have characteristics that are different from the other, including but not limited to a larger display area, greater color depth, motion sensors, cameras with different pixel ratings or move capabilities, etc. Each device (e.g. mobile device 402 and mobile device 404) may communicate with a network infrastructure 406 such as the Internet, corporate Intranet or local area network (LAN) or other public or private network. The communication medium can be wireless, or wired. A server 408 may be connected to the network infrastructure 406. The server 408 may act as an authentication server to authenticate mobile devices as described herein.

Figure 5:
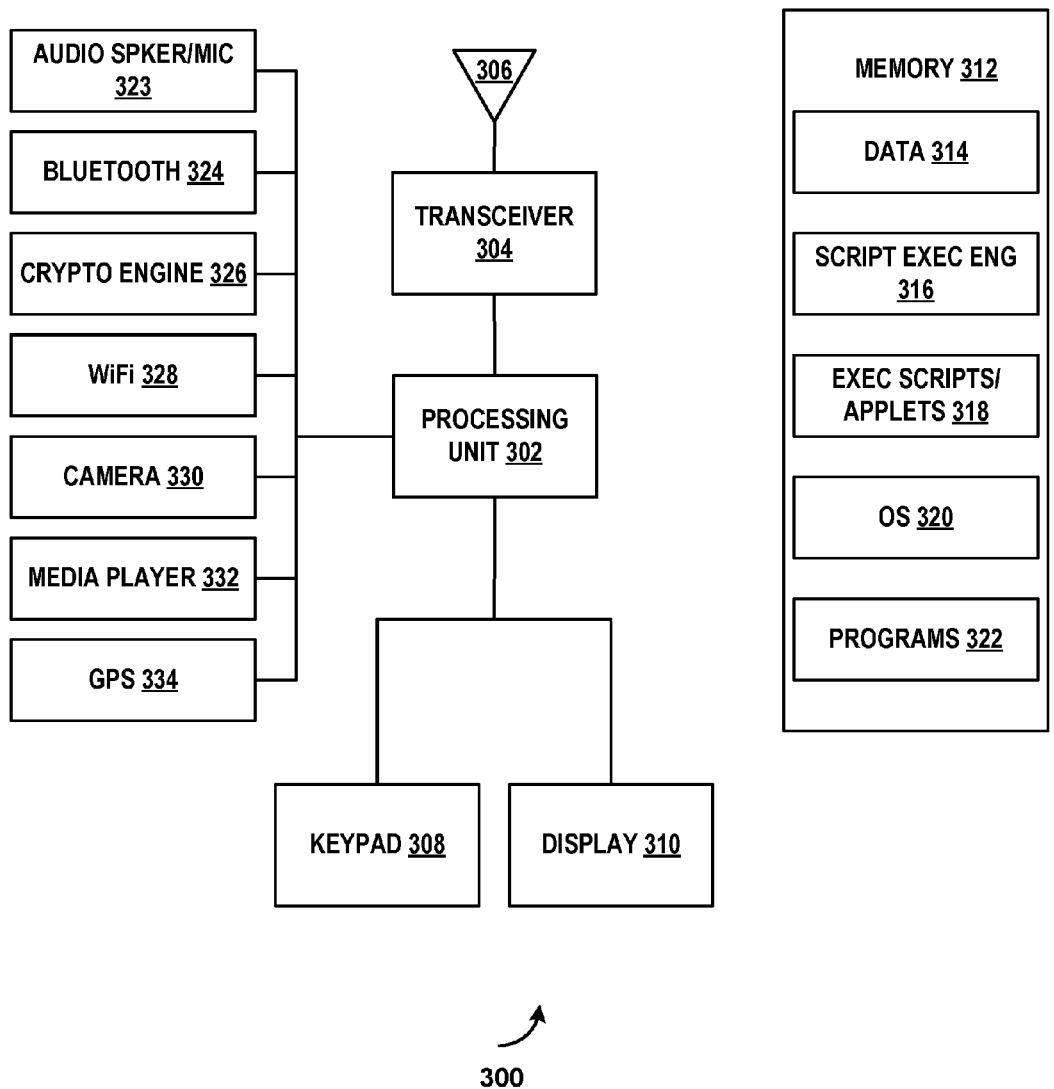
FIG. 5 is a block diagram of an example of a mobile device 300 in accordance with aspects of the subject matter disclosed herein.

FIG. 5 is an example of a mobile device 300. The mobile device 300 may be a cellular telephone, a smart phone, a personal digital assistant, a Bluetooth™ accessory or other portable device. The mobile device 300 may also be a computer with similar characteristics to the computer described with respect to FIG. 3 or may have a more limited capability platform with peripherals that are integral to the device, including but not limited to a built-in camera and display/keypad or touch screen.

The mobile device 300 may include a processing unit 302. The processing unit 302 may be a single chip processor with volatile and non-volatile memory (not shown), such as an ARM™ family processor, although other processors may also be used. The mobile device 300 may include a transceiver 304 for communication with a host device, (e.g., server 408 of FIG. 4). The transceiver 304 may support wireless communication via antenna 306, although the transceiver may support wireline communication in addition or alternatively. In a wireless configuration the transceiver 304 may support short-range communication, such as Wi-Fi, or may support wide-area communication via a cellular telephone or PCS infrastructure.

A user interface may be supported by a keypad 308 and a display 310. The keypad function may be incorporated in a touchscreen version of the display 310. A memory 312 can include both volatile and nonvolatile memory. The memory 312 may store data 314, including locally generated information such as telephone numbers as well as download information such as Web pages. The memory 312 may also store executable instructions that implement a script execution engine 316 such as a Java virtual machine or similar execution environment. Executable scripts or application/applet 318 may be interpreted and/or executed by the script execution engine 316. An operating system 320 may be used to support basic functions in the mobile device 300. Operating system 320 may also support user interface and communication primitives. Functions of the mobile device 300 may be supported by native or downloaded programs 322. Such programs may be associated with functions including but not limited to dialing a telephone and power management.

One or more built-in hardware or virtual peripherals including but not limited to a Bluetooth wireless capability 324, a cryptographic engine 326, a Wi-Fi transceiver 328, a global positioning satellite (GPS) receiver 334, a camera 330 a media player 332, etc. While some of these peripherals may include hardware, each of the peripherals may be associated with applications that support its interface to the mobile device 300 as well as support its user interface. Audio circuits 323 may include one or more speakers and one or more microphones.

While the subject matter disclosed herein has been described in connection with the figures, it is to be understood that modifications may be made to perform the same functions in different ways.

What is claimed:

1. An authentication server implemented on a system for authenticating a first user initiating a connection over a voice channel with a second user, the authentication occurring over a data channel substantially concurrently with the initiating the connection over the voice channel, wherein the authentication server is not the first user and is not the second user, comprising:
    a processor and a memory, the memory storing executable instructions which, when executed on the system by the processor, implements an authentication module that causes the system to use a data channel transmission to authenticate a current voice channel communication in a mobile network environment between the first user and the second user by:
        receiving a first request sent by the first user over the data channel to authenticate the first user;
        analyzing the first request to determine if the first request is an encrypted message or a signature of the first user, and if an encrypted message, decrypting the message;
        successfully authenticating the first user when the decrypted message, or in the alternate, the signature, is the same as first user information associated with the first user and stored in the authentication server;
        sending a first authentication message to the second user indicating that the first user has been authenticated;
        prompting the second user for authentication credentials over the data channel substantially concurrently with the established voice communication between the first user and the second user over the voice channel; and
        receiving from the second user over the data channel the second user authentication credentials.

2. The system of claim 1, wherein the authentication module receives a second request from the second user requesting that the authentication server authenticate the second user to the first user.

3. The system of claim 1, wherein the authentication module receives a confirmation request from the first user requesting the authentication server to authenticate the second user to the first user.

4. The system of claim 1, wherein if the decrypted message, or in the alternate, the signature, is not the same as the first user information, the authentication module, sends a failure message to the first user and the second user indicating that the authentication module is unable to authenticate the first user.

5. The system of claim 4, wherein decrypting the message comprises using one of asymmetric or symmetric key encryption/decryption methodologies.

6. The system of claim 1, wherein if the decrypted message, or in the alternate, the signature, is not the same as the first user information, the authentication module sends a failure message to the first user and the second user indicating that the authentication module is unable to authenticate the first user.

7. The system of claim 6, wherein decrypting the message comprises using one of asymmetric or symmetric key encryption/decryption methodologies.

8. A computer implemented method for providing authentication services, comprising:
   receiving a first request from a first user over a data channel for authentication of the first user substantially concurrent with the first user establishing a voice communication over a voice channel with a second user;
   analyzing the first request to determine if the first request is an encrypted message or a signature of the first user, and if an encrypted message, decrypting the message;
   successfully authenticating the first user when the decrypted message, or in the alternative, the signature, is the same as first user information associated with the first user and stored in the authentication server;
   sending a first authentication message to the second user over the data channel indicating the first user has been authenticated;
   prompting the second user for authentication credentials over the data channel substantially concurrently with the established voice communication between the first user and the second user over the voice channel;
   receiving from the second user over the data channel the second user authentication credentials;
   successfully authenticating the second user by comparing the second user authentication credentials with second user information associated with the second user and stored in the authentication server; and
   sending a second authentication message to the first user over the data channel indicating that the second user has been authenticated.

9. The computer implemented method of claim 8, wherein the first authentication message sent to the second user is an encrypted message comprising results of the first request from the first user.

10. The computer implemented method of claim 8, further comprising receiving a second request from the second user over a data channel requesting the authentication of the second user to the first user.

11. The computer implemented method of claim 8, further comprising receiving a confirmation request from the first user over the data channel, the confirmation request requesting authentication of the second user to the first user.

12. The computer implemented method of claim 8, wherein if the decrypted message, or in the alternate, the signature, is not the same as the first user information, sending a failure message to the first user and the second user over the data channel indicating a failure to authenticate the first user.

13. The computer implemented method of claim 8, wherein decrypting the message further comprises using one of asymmetric or symmetric key encryption/decryption methodologies.

14. A computer implemented method of authenticating communications, comprising
   connecting with a first user in a voice communication initiated by a first user over a voice channel;
   receiving an encrypted message from a remote authentication server comprising results of authentication of the first user over a data channel substantially concurrent with the communication over the voice channel;
   decrypting the encrypted message using an encryption/decryption methodology to obtain decrypted results;
   displaying the decrypted results on a display screen to a second user, wherein the second user is connected with the first user in the voice communication initiated by the first user;
   receiving a prompt from the remote authentication server on the display screen to authenticate the second user to the first user;
   sending a confirmation message over the data channel to the authentication server, the confirmation message comprising identification information of the second user to allow the authentication server to authenticate the second user to the first user by comparing information in the confirmation message with second user information stored in the authentication server.

15. The method of claim 14, wherein decrypting the encrypted message using an encryption/decryption methodology comprises decrypting the encrypted message using asymmetric or symmetric key encryption/decryption methodology.

* * * * *